United States Patent [19]

Borth et al.

[11] Patent Number: 5,263,052
[45] Date of Patent: Nov. 16, 1993

[54] VITERBI EQUALIZER FOR RADIO RECEIVER

[75] Inventors: David E. Borth; Bruce D. Mueller, both of Palatine; Kevin L. Baum, Hoffman Estates, all of Ill.

[73] Assignee: Motorola, Inc., Schaumburg, Ill.

[21] Appl. No.: 767,961

[22] Filed: Sep. 30, 1991

[51] Int. Cl.⁵ .............................................. H04L 5/12
[52] U.S. Cl. ........................................ 375/39; 375/56; 375/85; 375/94; 371/43
[58] Field of Search ............... 375/39, 84, 83, 18, 375/60, 17, 56, 85, 94; 371/43; 341/51

[56] References Cited

U.S. PATENT DOCUMENTS

| Re. 33,056 | 9/1989 | Forney, Jr. et al. ............. 375/39 |
| 4,748,626 | 5/1988 | Wong ............................... 375/39 |
| 4,761,784 | 8/1988 | Srinivasagopalan et al. ..... 371/43 |
| 4,763,328 | 8/1988 | Shimoda et al. ................. 371/43 |
| 4,891,806 | 1/1990 | Farias et al. .................... 375/106 |
| 5,023,889 | 6/1991 | Divsalar et al. ................. 375/85 |

Primary Examiner—Curtis Kuntz
Assistant Examiner—Don N. Vo
Attorney, Agent, or Firm—Robert H. Kelly

[57] ABSTRACT

A Viterbi equalizer for decoding a $\pi/4$ DQPSK modulated signal. Because symbol values of adjacent symbols of a $\pi/4$ DQPSK signal are offset in phase relative to one another, allowable values of succeeding states of a $\pi/4$ DQPSK signal are four in number. The signal paths of the Viterbi equalizer are thereby limited in number to four allowable next-states, and the Viterbi equalizer is operative to select certain ones of the paths connecting the states at the adjacent time intervals as survivor paths to form maximum likelihood paths thereby.

9 Claims, 5 Drawing Sheets

VITERBI EQUALIZER FOR RADIO RECEIVER

BACKGROUND OF THE INVENTION

The present invention relates generally to receiver circuitry of a receiver operative to receive a modulated signal, and, more particularly, to a Viterbi equalizer, and a maximum likelihood sequence estimator incorporating such, which forms a portion of the receiver.

A communication system is operative to transmit information (referred to hereinbelow as an "information signal") between two or more locations, and includes a transmitter and a receiver interconnected by a transmission channel. Information is transmitted by the transmitter to the receiver upon the transmission channel. A radio communication system is a communication system in which the transmission channel comprises a radio-frequency channel wherein the radio-frequency channel is defined by a range of frequencies of the electromagnetic frequency spectrum.

The transmitter forming a portion of a radio communication system includes circuitry for converting the information signal which is to be transmitted into a form suitable for transmission thereof upon the radio-frequency channel. Such circuitry is referred to as modulation circuitry which performs a process referred to as modulation. In such a process, the information signal is impressed upon a radio-frequency electromagnetic wave wherein the radio-frequency electromagnetic wave is of a frequency within the range of frequencies defining the radio-frequency channel upon which the information signal is to be transmitted. The radio-frequency electromagnetic wave is commonly referred to as the "carrier signal", and the radio-frequency electromagnetic wave, once modulated by the information signal, is commonly referred to as the modulated signal.

Various modulation schemes are known for impressing the information signal upon the carrier signal to form the modulated signal.

One such modulation scheme is phase modulation in which the information signal is impressed upon the carrier signal in a manner to cause the phase of the carrier signal to be altered corresponding to the information content of the information signal. Phase changes of the modulated signal thereby form the information content of the modulated signal. Proper detection of the phase of the modulated signal permits recreation of the information signal.

A related modulation scheme is differential phase modulation in which differential phase changes of the modulated signal (i.e., phase differences between adjacent portions of the modulated signal) form the information content of the modulated signal. Proper detection of differential phase changes of the modulated signal permits recreation of the information signal.

Radio communication systems are advantageous in that no physical interconnection is required between the transmitter and the receiver; once the information signal is modulated to form the modulated signal, the modulated signal may be transmitted over large distances.

A cellular, communication system is one type of radio communication system. Radio telephones operative in such a cellular, communication system contain circuitry permitting simultaneous generation and reception of modulated signals, to permit thereby two-way communication between the radio telephones and remotely-located transceivers. These remotely-located transceivers, commonly referred to as "base stations", are physically connected to conventional telephonic networks to permit communication between a radio telephone and a fixed location of the conventional telephonic network.

A cellular, communication system is formed by positioning numerous base stations at spaced-apart locations throughout a geographical area. Each base station contains circuitry to receive modulated signals transmitted thereto by one, or many, radio telephones, and to transmit modulated signals to the one, or many, radio telephones. A frequency band (in the United States, extending between 800 MHz and 900 MHz) is allocated for radio telephone communication upon a cellular, communication system.

The positioning of each of the base stations forming the cellular, communication system is carefully selected to ensure that at least one base station is positioned to receive a modulated signal transmitted by a radio telephone positioned at any location throughout the geographical area.

Because of the spaced-apart nature of the positioning of the base stations, portions of the geographical area throughout which the base stations are located are associated with individual ones of the base stations. Portions of the geographical area proximate to each of the spaced-apart base stations define "cells" wherein the plurality of cells (each associated with a base station) together form the geographical area encompassed by the cellular, communication system. A radio telephone positioned within the boundaries of any of the cells of the cellular, communication system may transmit, and receive, modulated signals to, and from, at least one base station.

As the base stations and radio telephones of the cellular, communication system contain circuitry to permit continuous and uninterrupted communication between the radio telephone and a base station associated with a cell in which the radio telephone is positioned as the radio telephone is moved between cells, communication upon a cellular, communication system is particularly advantageous by one operating a radio telephone when travelling in an automotive vehicle.

Increased popularity of communication upon a cellular, communication system has resulted, in some instances, in the full utilization of every available channel of the frequency band allocated for cellular, radio telephone communication. As a result, various ideas have been proposed to utilize more effectively the frequency band allocated for radio telephone communication. By more efficiently utilizing the frequency band allocated for radio telephone communication, the transmission capacity of an existing cellular, communication system may be increased.

One such proposal permits two or more radio telephones to share a single transmission channel. When the two or more radio telephones transmit or receive signals over a single transmission channel, the capacity of an existing cellular, communication system may be doubled. While the signals transmitted from, or to, the radio telephones which share the same transmission channel can not be simultaneously transmitted (simultaneous transmission would cause signal overlapping, thereby preventing signal detection of either of the signals), the signals can be transmitted in intermittent bursts. By encoding an information signal into discrete form (to form, e.g., a discrete, binary data stream) and modulating the discretely-encoded signal generated by such encoding process, the resultant modulated signal may be transmitted in intermittent bursts. Such modulated signals may be recreated by the receiver to determine thereby the information content of the transmitted signal.

A modulation technique suitable for modulating the discretely-encoded information signal upon a carrier signal is the aforementioned, differential, phase modulation technique. More particularly, a specific, differential modulation technique, a π/4 differential, phase-shift-keying (DQPSK) modulation technique has been selected as the standard modulation technique for cellular, communication systems of increased capacity in the United States.

Encoding of an information signal into a discrete binary data stream is also advantageous as noise introduced upon the modulated signal during transmission thereof upon the transmission channel may be more easily detected and removed when the information signal is comprised of a discrete binary data stream than when the information signal is comprised of a conventional, analog signal.

Distortion occurring during transmission of a modulated signal comprised of a discretely-encoded, information signal (and modulated by the π/4 DQPSK modulation technique above-noted) may be removed by equalizer circuitry forming a portion of the receiver circuitry. The equalizer may, for instance, comprise a maximum likelihood sequence estimator (MLSE) such as that described in an article entitled "Adaptive Maximum-Likelihood Receiver For Carrier-Modulated Data-Transmission System", by Gottfried Ungerboeck in the IEEE Transaction On Communication, Volume COM-22, No. 5, May 1974.

The MLSE disclosed therein is preferably comprised of a matched filter and a Viterbi equalizer. Both the matched filter and the Viterbi equalizer may be implemented by an algorithm embodied in processor circuitry.

A modulated signal received by the receiver is demodulated by the demodulator circuitry, and then applied to the matched filter of the MLSE. The matched filter generates a filtered signal which is supplied to the Viterbi equalizer. The Viterbi equalizer is operative to correct for distortions of the signal occurring during transmission thereof upon a frequency channel.

The Viterbi equalizer determines maximum likelihood paths which are representative of a sequence of symbols which are most likely to occur. The number of possible paths of the Viterbi algorithm is related, not only to the number of allowable symbol values of the modulated signal (in the instance of a π/4 DQPSK signal, while the signal, at any time is of four possible values of a first subset of values, the signal at a succeeding time is of four possible values of a second subset of values; therefore, in totality, a π/4 DQPSK signal may be of eight different values), but is also exponentially related to the number of symbols in a sequence of symbols. Because of this exponential relationship, the number of calculations required of the Viterbi equalizer to determine maximum likelihood paths becomes quite significant. Such a significant number of required calculations is time-consuming and significant processing time is required of the Viterbi equalizer to make a proper determination.

A Viterbi equalizer of reduced complexity requiring less processing time to make a proper determination of a maximum likelihood path would, accordingly, be desirable.

SUMMARY OF THE INVENTION

The present invention, accordingly, advantageously provides a Viterbi equalizer for detecting a signal.

The present invention further advantageously provides a Viterbi equalizer for a receiver operative to receive a π/4, differential, phase-shift-keying, modulated signal.

The present invention includes further advantages and features, the details of which will become more apparent by reading the detailed description of the preferred embodiments hereinbelow.

In accordance with the present invention, therefore, a Viterbi equalizer is disclosed for detecting a signal comprised of a plurality of symbols, wherein each symbol of the plurality of symbols comprising the signal is of a symbol value corresponding to a symbol value of a symbol of a set of allowable symbols. The Viterbi equalizer defines allowable states at certain time intervals with allowable states defined by sets of symbol values, and paths connecting the allowable states at adjacent ones of the certain time intervals. At least two adjacent ones of the certain time intervals form groups of the certain time intervals with individual ones of the at least two adjacent ones of the certain time intervals having associated therewith subsets of the allowable states. The subsets associated with the certain time intervals of the groups of the certain time intervals are comprised of nonoverlapping elements such that paths connecting the allowable states extend between the allowable states comprising the subsets associated with respective ones of the certain time intervals. The Viterbi equalizer is operative to select paths connecting the states at the adjacent time intervals as survivor paths to form maximum paths thereby to detect the signal.

BRIEF DESCRIPTION OF THE DRAWINGS

The present invention will be better understood when read in light of the accompanying drawings in which.

DESCRIPTION OF THE PREFERRED EMBODIMENTS

Figure 1:
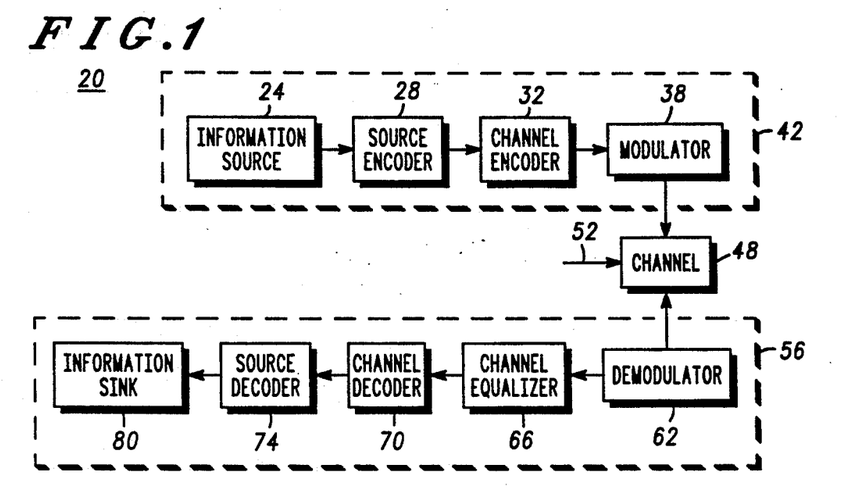
FIG. 1 is a block diagram of a communication system operable to transmit and to receive an information signal.

Referring first to the block diagram of FIG. 1, a communication system, referred to generally by reference numeral 20, is shown. Communication system 20 is operable to transmit and to receive digitally-encoded information signals. An analog information source, here represented by block 24, is representative of the source of an information signal, such as, for example, a voice signal or a data signal. In instances in which information source 24 is comprised of a voice signal, information source 24 includes a transducer, or other suitable circuitry, for converting the voice signal into an electrical signal of a desired characteristic.

The information signal generated by analog information source 24 is supplied to source encoder 28. Source encoder 28 converts the information signal supplied thereto by information source 24 into a digital signal according to an encoding scheme.

The digital signal generated by source encoder 28 is supplied to channel encoder 32. Channel encoder 32 encodes the digital signal supplied thereto according to a coding technique, such as, for example, a block and/or convolutional coding technique. Channel encoder 32 is operative to increase the redundancy of the digital signal supplied thereto by source encoder 28. By increasing the redundancy of the digital signal, distortion of a signal transmitted upon a frequency channel is less likely to result in erroneous interpretation of the information content of the information signal generated by information source 24.

The encoded signal generated by channel encoder 32 is supplied to modulator 38. Modulator 38 is operative to modulate the encoded signal supplied thereto according to a modulation technique. In the preferred embodiment of the present invention, modulator 38 is operative to modulate the signal supplied thereto according to a differential-encoding modulation scheme, and, in particular, to form $\pi/4$ DQPSK-modulated signal.

Information source 24, source encoder 28, channel encoder 32, and modulator 38 together comprise the transmitter, designated by reference numeral 42, and illustrated by a block, shown in hatch, of communication system 20.

Modulator 38 generates a modulated signal, here, again, preferably a $\pi/4$ DQPSK-modulated signal, which is transmitted upon a frequency channel, here indicated by block 48. Typically, the channel upon which the modulated signal is transmitted is not noise-free, but, rather, distortion caused by noise (indicated in the figure by arrow 52) and intersymbol interference result in distortions of the modulated signal generated by transmitter 42.

The modulated signal transmitted by transmitter 42 upon frequency channel 48 is received by a receiver 56, here indicated by a block, shown in hatch. Receiver 56 represents a receiver which incorporates the system and method of the present invention.

The received signal received by receiver 56 is applied to demodulator 62 which forms a portion of receiver 56. Demodulator 62 demodulates the received signal by a process which is essentially the reverse of the process by which modulator 38 of transmitter 42 generates the modulated signal.

Demodulator 62 generates a demodulated signal which is supplied to channel equalizer 66. Channel equalizer 66 is operative to correct for distortions to the signal transmitted upon frequency channel 48.

Channel equalizer 66 generates an equalized signal which is supplied to channel decoder 70. Channel decoder 70 corresponds to encoder 32 of transmitter 42 of system 20, but functions to decode the equalized (but still encoded) signal supplied thereto by channel equalizer 66.

Channel decoder 70 generates a decoded signal which is supplied to source decoder 74. Source decoder 74 converts the signal supplied thereto into a form suitable for application to information sink 80. Information sink 80 may, for example, comprise an ear piece or speaker portion of a receiver, or another such transducer for converting the electrical signal comprising the decoding signal generated by source decoder 74 into human perceptible form.

The blocks representing demodulator 62, channel equalizer 66, channel decoder 70, source decoder 74, and information sink 80 are pictured within the block designating receiver 56 to represent thereby that the respective circuitry of block 62-80 together comprise the receiver.

Figure 2:
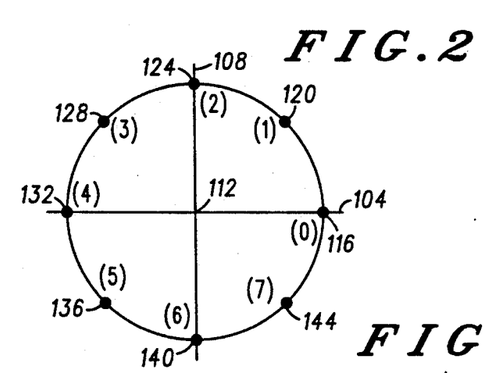
FIG. 2 is a graphical representation illustrating the constellation set formed of the allowable symbols of a π/4 DQPSK signal.

Turning now to the graphical representation of FIG. 2, the constellation set of a $\pi/4$ DQPSK signal is graphically represented. The constellation set is plotted upon an axis system formed of abscissa axis 104 and ordinate axis 108 wherein the two axes intercept at origin 112. Abscissa and ordinate axes 104 and 108 are oftentimes referred to as real and imaginary axes, respectively.

It is noted that, while the following detailed description of the preferred embodiment is explained in terms of a $\pi/4$-DQPSK modulation scheme, equalizer circuitry complexity of many other modulation schemes may be similarly reduced. For instance, an equalizer operative in an eight-level PSK scheme having binary, phase-shift-keying modulation, would analogously be of reduced complexity.

The symbol set comprised of symbol values which together form the constellation set of the $\pi/4$ DQPSK signal are represented by points 116, 120, 124, 128, 132, 136, 140, and 144 positioned equidistantly about a unit circle extending about origin 112. When axes 104 and 108 are referred to as the real and imaginary axes, respectively, each point 116–144 may be represented by a magnitude and a phase. Because the magnitude of each point 116–144 is identical (due to the positioning of the respective points 116–144 at identical distances from origin 112 upon the unit circle), each point 116–144 may be represented solely by a phase. The eight points comprising the symbol set of $\pi/4$ DQPSK, because of the equidistant spacings thereof about origin 112, are spaced apart from one another by an angular phase of forty-five degrees. In terms of radians, therefore, point 116 may be referred to as the zero symbol, point 120 may be referred to as the $\pi/4$ symbol, point 124 may be referred to as the $\pi/2$ symbol, point 128 may be referred to as the $3\pi/4$ symbol, point 132 may be referred to as the $\pi$ symbol, point 136 may be referred to as the $5\pi/4$ symbol, point 140 may be referred to as the $3\pi/2$ symbol, and point 144 may be referred to as the $7\pi/4$ symbol. In a differential-encoding scheme, the information content of a modulated signal is contained in the differential phase changes between adjacent symbols.

Points 116-144 may also be designated by numbers 0-7, i.e., point 116 may be designated by "0", point 120 may be designated by "1", point 124 may be designated by "2", etc.

Accordingly, in a π/4 DQPSK modulation scheme, the phase changes between adjacent symbols of the modulated signal form the information content of the signal. Allowable phase changes between adjacent symbols of a π/4 DQPSK signal are defined to be +/−π/4, and +/−3π/4. When modulator 38 of transmitter 42 forms a π/4 DQPSK, modulated signal, each symbol of the modulated symbol is of a phase corresponding to one of the phases defining points 116-144, and, adjacent symbols of the resultant, modulated signal are offset in phase by a phase as above-defined.

Figure 3:
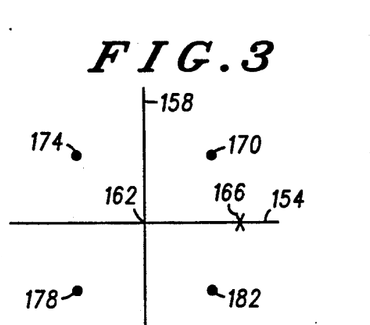
FIG. 3 is a graphical reprsentation illustrating the relationship between adjacent symbols of a π/4 DQPSK modulation scheme.

Turning now to the graphical representation of FIG. 3, the relationship between adjacent symbols of a π/4 DQPSK modulation scheme is illustrated. Similar to the axis system defined in the graphical representation of FIG. 2, abscissa and ordinate axes, here axes 154 and 158, respectively, intercept at an origin, here origin 162. A symbol having a phase of zero radians, here denoted by "X" 166 is plotted upon abscissa axis 154. A symbol transmitted subsequent to symbol 166 and immediately adjacent thereto, is offset in phase relative to symbol 166 by a phase as above defined (i.e., +/−π/4 or +/−3π/4 radians).

Graphically, the next-state symbol must be offset in phase relative to the phase of symbol 166. In particular, and according to the above-described scheme, a symbol transmitted subsequent to transmission of symbol 166 must be of a phase corresponding to symbols 170, 174, 178, or 182. It is noted that symbol 166 is plotted upon axis 154, and each possible, subsequently-transmitted symbol is offset in phase, and is not of a phase which is plotted upon one of the axes 154 or 158. Similarly, if symbol 166 were, alternately, of a phase such that symbol 166 would be plotted upon ordinate axis 158, the possible, subsequently-transmitted symbols would similarly be plotted at location offset of the axes 154 and 158.

Figure 4:
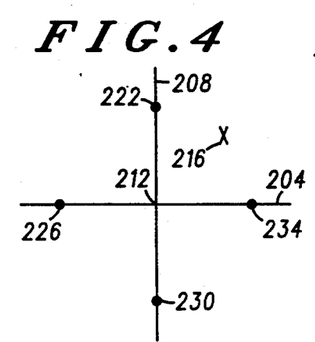
FIG. 4 is a graphical representation, similar to that of FIG. 3, which also illustrates the relationship between adjacent symbols of a π/4 DQPSK modulation scheme.

Turning now to the graphical representation of FIG. 4, the relationship between adjacent symbols at the π/4 DQPSK, modulation scheme is again illustrated. Similar to axis system defined in the graphical representation of FIG. 3, abscissa and ordinate axes, here axes 204 and 208, respectively, intersect at an origin, here origin 212. A symbol having a phase of π/4 radians, here denoted by "X" 216 is plotted upon the axis system 204-208. A symbol transmitted subsequent to symbol 216 and immediately adjacent thereto, is offset in phase relative to symbol 216 by a phase as above-defined. Graphically, the next-state symbol must be offset in phase relative to the phase of symbol 216. In particular, and according to the above-described scheme, a symbol transmitted subsequent to transmission of symbol 216 must be of a phase corresponding to symbol 222, 226, 230, or 234.

It is noted that symbol 216 is plotted offset from both axes 204 and 208, and each possible, subsequently-transmitted symbol is offset in phase and is of a phase which is plotted upon one of the axes 204 and 208. Similarly, if symbol 216, alternately, were of a phase corresponding to any of the other symbol values offset in phase relative to axes 204 and 208, the possible subsequently-transmitted symbol would similarly be plotted at locations upon one of the axes 204 or 208.

Figure 5:
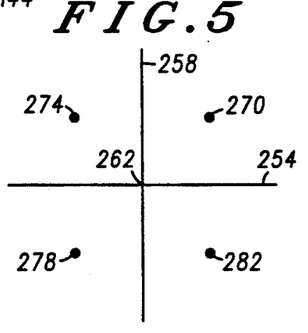
FIG. 5 is a graphical representation, which illustrates a first subset of symbols of the allowable symbol values of a π/4 DQPSK signal.

FIG. 5 is a graphical representation which, similar to the graphical representations of the preceding figures, is defined by an axis system formed of mutually-perpendicular axes, here axes 254 and 258 which intersect at an origin, here origin 262. Points 270, 274, 278, and 282 are representative of four of the allowable symbol values of a π/4 DQPSK modulated signal. Points 270-282 correspond to points 170-182 of FIG. 3. Points 270-282 are therefore representative of the possible, subsequently-transmitted symbols which can be transmitted immediately adjacent to transmission of a symbol which would be represented by a point on one of the axes 254 or 258. Points 270-282, representative of four symbol values of a π/4 DQPSK modulated signal, can be considered to form a first subset of symbols.

Figure 6:
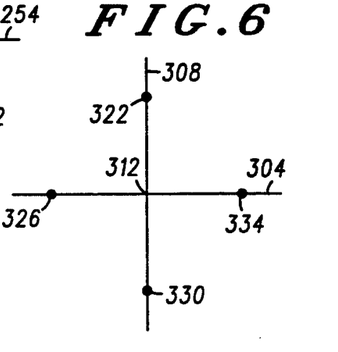
FIG. 6 is a graphical representation which illustrates a second subset of symbols of the allowable symbol values of a π/4 DQPSK signal.

FIG. 6 is a graphical representation which, similar to the graphical representations of the preceding figures, is defined by an axis system formed of mutually-perpendicular axes, here axes 304 and 308 which intersect at an origin, here origin 312. Points 322, 326, 330, and 334 are representative of four of the allowable symbol values of a π/4 DQPSK modulated signal, and, hence, form a subset thereof. Points 322-334 are therefore representative of the possible, subsequently-transmitted symbols transmitted immediately adjacent to transmission of symbol which would be represented by a point offset from one of the axes 304 or 308. Points 322-334, representative of four symbol values of a π/4 DQPSK modulated signal, can be considered to form a second subset of symbols.

With reference again to the block diagram of communication system 20 of FIG. 1, when modulator 38 of transmitter 42 is operative to modulate the signal supplied thereto according to a π/4 DQPSK modulation scheme, the signal transmitted upon transmission channel 48 may be represented by the following equation:

$$x(t) = \sum_n a_n f(t - nT)$$

where:

$$a_n = e^{j2\pi d n/8};$$

$d_n$ in the exponent is a data symbol having values 0-7 (corresponding to the numerical values assigned to points 116-144 of FIG. 2); and f(t) is the value of transmitted, equivalent base band pulse of a binary signal applied to modulator 38. The sequence of symbols represented by the equation form the symbol values of the symbols comprising the modulated signal.

The signal received by receiver 56, after transmission thereof by transmitter 42 upon transmission channel 48, may be represented by the following equation:

$$y(t) = \sum_n a_n h(t - nT) + w(t)$$

where:
h(t)=g(t)*f(t)—i.e., the convolution of the transmitted equivalent based band pulse and the complex, low-pass-filter equivalent, impulse response of a multipath channel comprising transmission channel 48;

w(t) is a time-varying value representative of additive white, gaussian noise (AWGN).

Demodulator 62 of receiver 56 of FIG. 1 is operative to reduce the frequency of the signal transmitted upon transmission channel 48 to generate a signal of a baseband frequency. The signal of the baseband frequency may be represented by the same equation as that, noted above, which represents the signal received by the receiver, and, accordingly, the signal supplied to channel equalizer 66 may also be represented by the above equation.

Figure 7:
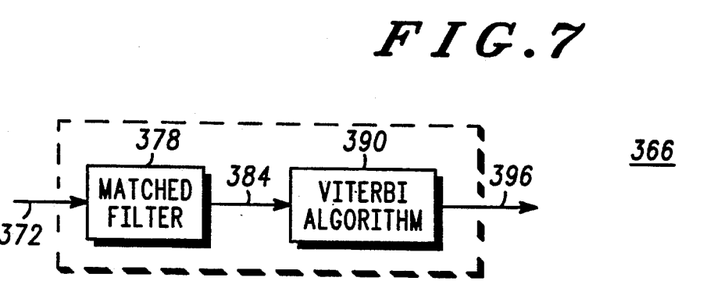
FIG. 7 is a block diagram of a maximum likelihood sequence estimator, which includes a Viterbi equalizer, comprising a channel equalizer of a receiver of a preferred embodiment of the present invention.

Channel equalizer 66 of receiver 56 is preferably comprised of a maximum likelihood sequence estimator (MLSE), as above-noted. FIG. 7 is a block diagram of a MLSE, denoted by reference numeral 366, which comprises channel equalizer 66, shown in FIG. 1, of the preferred embodiment of the present invention. MLSE 366 receives a sequence of symbols on line 372 which is supplied to matched filter 378. Matched filter 378 generates a filtered signal on line 384 which is supplied to Viterbi equalizer 390. Viterbi equalizer 390 generates an equalized signal on line 396. The signal generated on line 396 is provided to channel decoding circuitry, represented in FIG. 1 by channel decoder 70. (It is noted, of course, that in other embodiments, a channel may be formed of a Viterbi equalizer without the addition of a matched filter.)

Matched filter 378 of MLSE 366 computes a value, referred to as a sufficient statistic $z_n$ which may be represented mathmatically by the following equation:

$$z_n = g_{MF}(t) * y(t)|_{t=nT} = \sum_l a_{n-l} s_l + r_n$$

where:

$g_{MF}(t)$ is the gain of the matched filter;

$y(t)$ is the received signal (as above defined);

$r_n$ is a sample sequence; and the channel autocorrelation, $s_l$, is the convolution of the following:

$$s_l = g_{MF}(t) * h(t)|_{t=nT=s-l}*.$$

It is also noted that the gain of the matched filter, $g_{MF}(t)$ is also equal to the time-inverse, complex conjugate of $h(t)$, i.e., $$g_{MF}(t) = h^*(t).$$

MLSE 366 is operative to determine, as the sequence most likely to have been transmitted, the sequence $[a_n]$ that maximizes the value of a metric equation, referred to as the survivor metric, $J_n(\sigma_n)$ between the states $[\sigma_{n-1}]$ to state $\sigma_n$ according to the following equation:

$$J_n(\sigma_n) = 2 \operatorname{Re}(a_n^* z_n) + \max\{J_{n-1}(\sigma_{n-1}) - F(\sigma_{n-1}, \sigma_n)\} \{\sigma_{n-1}\} \to \sigma_n$$

where $F(\sigma_{n-1}, \sigma_n)$ is defined to be a state transition metric governed by the following equation:

$$F(\sigma_{n-1}, \sigma_n) = a_n^* s_0 a_n + 2\operatorname{Re}\left(a_n^* \sum_{l=1}^{L} s_l a_{n-l}\right)$$

where $\sigma_n = \{d_{n-L+1} \ldots d_n\}$; and

L is a number of symbols of memory.

The states $\sigma_{n-1}, \sigma_n$ are defined to be allowable sets of symbol values of the constellation set of a modulation scheme.

Viterbi equalizer 390 of MLSE 366 is operative to generate values of the survivor metric $J_n(\sigma_n)$. It is noted that in the $\pi/4$ DQPSK modulation scheme, the magnitude of $a_n$ is 1, i.e., $|a_n| = 1$. Accordingly, the equation defining the survivor metric $J_n(\sigma_n)$ may be rewritten as the following:

$$J_n(\sigma_n) = 2\operatorname{Re}(a_n^* z_n) + \max\{J_{n-1}(\sigma_{n-1}) - F(\sigma_{n-1}, \sigma_n)\} \{\sigma_{n-1}\} \to \sigma_n$$

where the state transition metric $F(\sigma_{n-1}, \sigma_n)$ is:

$$F(\sigma_{n-1}, \sigma_n) = \operatorname{Re}\left(a_n^* \sum_{l=1}^{L} s_l a_{n-l}\right)$$

As mentioned previously, and as the above equations describe mathematically, a Viterbi equalizer is operative to determine a maximum likelihood path which is representative of a sequence of symbols which are most likely to occur. The Viterbi equalizer is typically formed of an algorithm (a Viterbi algorithm) embodied within processing circuitry. The above equations (e.g., the equations which define the survivor metric and the state transition metric) may be embodied in such a Viterbi algorithm. A hardware implementation of such an equalizer is, of course, also possible.

Operation of a Viterbi equalizer (which, again, is typically comprised of a Viterbi algorithm embodied within appropriate processor circuitry) is oftentimes represented pictorially by a trellis in which allowable states of a signal are represented as elements of vertically-extending columns. The allowable signal states of adjacent time periods are similarly pictorially represented by similar, vertically-extending columns. The collection of vertically-extending columns, each representative of the possible symbol values of a symbol at any interval in time forms an array; such an array is commonly referred to as the trellis of the Viterbi equalizer.

Figure 8A:
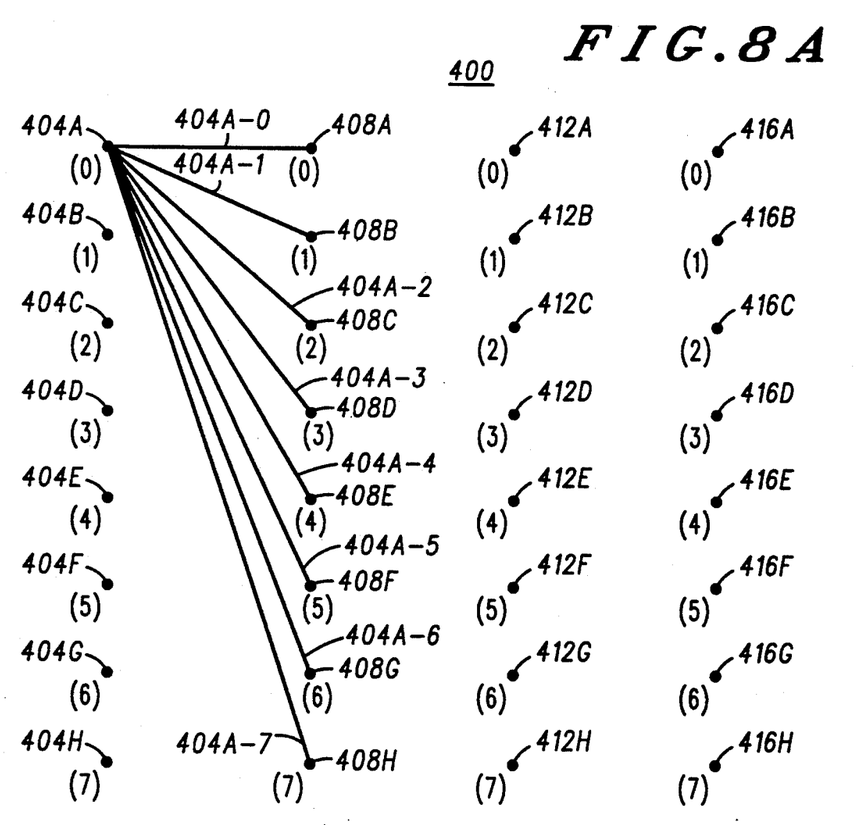
FIG. 8A is a pictorial representation of a trellis typically utilized to represent operation of a Viterbi equalizer.

FIG. 8A is a pictorial representation of a portion of such a trellis. The trellis is designated in the Figure by reference numeral 400. Trellis 400 represents an eight-state Viterbi equalizer (in which the equalizer memory, L, equals one) operative to detect an eight-level signal. Such signal may, for example, comprise an eight PSK signal constellation, or a $\pi/4$ DQPSK signal constellation. Trellis 400 is representative of existing equalizers operative in a receiver which receives a $\pi/4$ DQPSK-modulated signal. The constellation set shown in FIG. 2 forms an eight-level signal in which any symbol may be of a value, here phases, corresponding to points 116–144, and represented by numerical values 0–7 of the constellation set. Trellis 400 is representative of a simplified equalizer in which the set of symbols defining the states of the trellis is comprised of a single symbol.

In a conventional eight-level system, the symbol value of a subsequently-transmitted symbol may also be of any of eight values.

Points forming the elements of a first vertically-extending column are denoted in the figure by reference numerals 404A–404H, the points representing the elements of a second vertically-extending column are represented by points 408A–408H, the points representing the elements of a third vertically-extending column are represented by points 412A–412H, and the points representing the elements of a fourth, vertically-extending column 416A–416H are denoted by reference numerals 416A–416H. (Additional columns representing additional symbols can, of course, be similarly drawn). Points 404A-H, 408A-H, 412A-H, and 416A-H are also designated by states 0-7 corresponding to the allowable states (denoted by $\sigma$ in the preceding equations) formed of sets of the allowable symbol values defined by the constellation set of FIG. 2. For trellis 400, each set is comprised of a single symbol (i.e., in the preceding equations, L=1).

Lines interconnecting elements of adjacent ones of the vertically-extending columns indicate allowable state transitions permitted between states of adjacent time intervals. In a conventional eight-level system, at any time interval, each state is comprised of sets of symbols of eight possible values. For any state of the trellis, there are eight possible next states. In FIG. 8A, lines, indicated by reference numerals 404A-0–404A-7, indicate the possible state transitions between symbol 404A and possible, succeeding states. Eight different paths are possible. Similar paths may be drawn for symbols 404B–404H. Accordingly, sixty-four possible combinations of state transitions are possible between any two adjacent intervals. (Such paths, while not shown in the Figure for reasons of clarity, together form groups of intersecting lines characteristic of a trellis.) Calculation of the equations previously described for calculating survivor metrics and state transition metrics must be performed for each path represented upon the trellis.

However, upon careful analysis of a $\pi/4$ DQPSK signal, (as shown previously in the graphical representations of FIGS. 3 and 4), it is seen that for any particular symbol value, only four possible next-state symbol values are possible. Such next-state symbol values may be of values only as illustrated in FIGS. 5 and 6. As the states of trellis of the Viterbi equalizer are sets of symbols, for any state of the trellis, there are only four possible next states, and not eight possible next states, as in trellis 400 of FIG. 8. For any symbol value, therefore, only four next-state values are possible, and not the eight possible next-state values as is possible in a conventional eight-level signal, as indicated by trellis 400 of a Viterbi equalizer operative therefor. This characteristic of a $\pi/4$ DQPSK signal may be advantageously utilized to reduce the number of calculations required to determine the survivor metrics of a Viterbi equalizer.

Figure 8B:
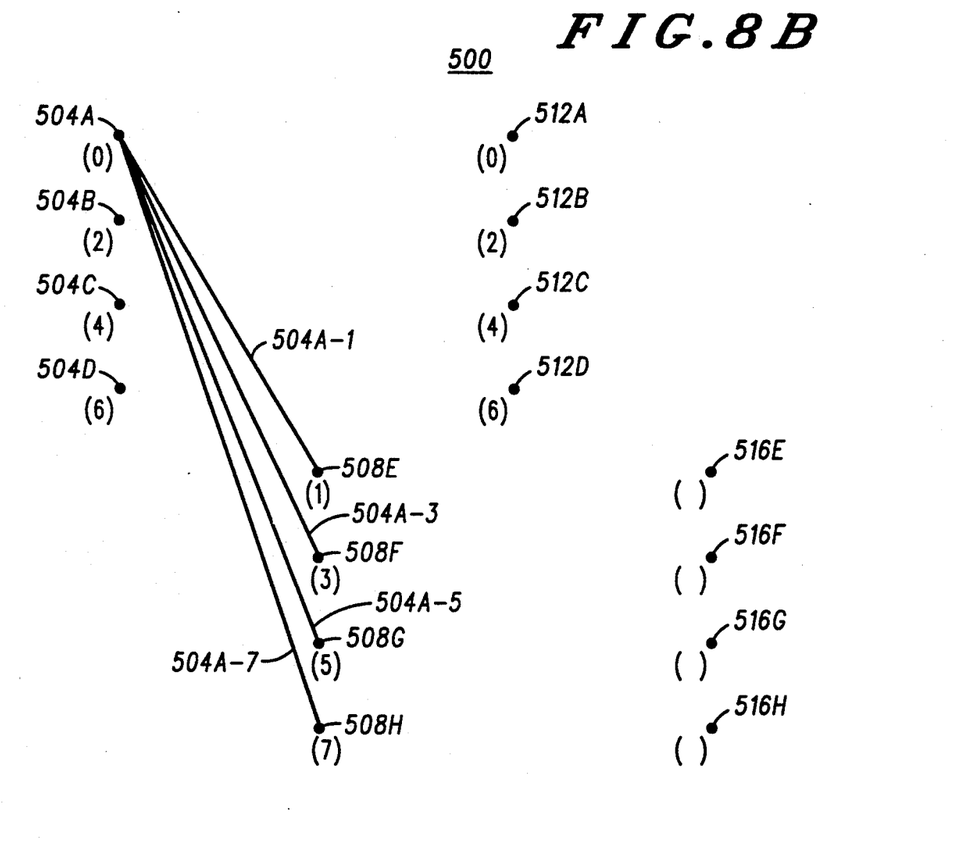
FIG. 8B is a pictorial representation of a trellis of a Viterbi equalizer, similar to that of FIG. 8A, but representative of the Viterbi equalizer of a preferred embodiment of the present invention.

FIG. 8B is a pictorial representation of a trellis, referred to generally by reference numeral 500 representative of the Viterbi equalizer of a preferred embodiment of the present invention operative to receive a signal modulated by a $\pi/4$ DQPSK modulation scheme.

Trellis 500, similar to that of trellis 400 of FIG. 7, is comprised of vertically-extending columns comprised of elements representative of allowable states of a signal. Trellis 500 differs, however, with that of trellis 400 of FIG. 8A in that, rather than each column being comprised of eight elements, each column of trellis 500 is comprised of four elements. More particularly, a first column of trellis 500 is formed of points 504A, 504B, 504C, and 504D; a second column of trellis 500 is comprised of points 508E, 508F, 508G, and 508G, and 508H; a third column of trellis 500 is comprised of points 512A, 512B, 512C, and 512D; and a fourth column of trellis 500 is comprised of points 512E, 512F, 512G, and 512H. Again points 504A-D-516E-H are also designated by states 0-7 corresponding to the allowable states formed of sets of the allowable symbol values defined by the constellation set of FIG. 2. For trellis 500, each set is comprised of a single symbol (i.e., in the proceding equations, L=1).

For instance, points 504A-504D may be representative of the symbols having values corresponding to values of the symbols represented by points 266-278 of the first subset of symbols of FIG. 5, and points 508E-508H may be representative of the symbols having values c correspoding to the values of the symbols represented by points 322-334 of the second subset of symbols of FIG. 6.

For any given state, there are only four possible next states. For instance, four paths are possible between point 504A and a next-state. Such possible paths are indicated by lines 504A-0, 504A-1, 504A-2, 504A-3, and 504A-4. Similar paths could be drawn by points 504B-504D. (Such paths are not shown in the Figure for reasons of clarity.) Accordingly, sixteen combinations of state transitions are possible between any two adjacent intervals. Such a value of possible combinations is significantly less than the number of possible combinations of trellis 400 or FIG. 8A.

Examination of trellis 500 thereby illustrates that the Viterbi equalizer represented thereby is constructed in a manner such that allowable states at alternating symbol times are representative of the first subset of symbol values, and the allowable states at intervening symbol times are representative of the second subset of symbols.

In other modulation schemes, a similar reduction in Viterbi equalizer complexity may be realized.

Construction of a Viterbi equalizer, such as a Viterbi algorithm embodied within processing circuitry, operative in a manner similar to that which is representative of trellis 500 of FIG. 8B is far less complex than existing Viterbi equalizers, and may, accordingly, permit faster operation of a Viterbi equalizer operative to detect a discretely-encoded signal formed by a $\pi/4$ DQPSK modulation technique.

Figure 9:
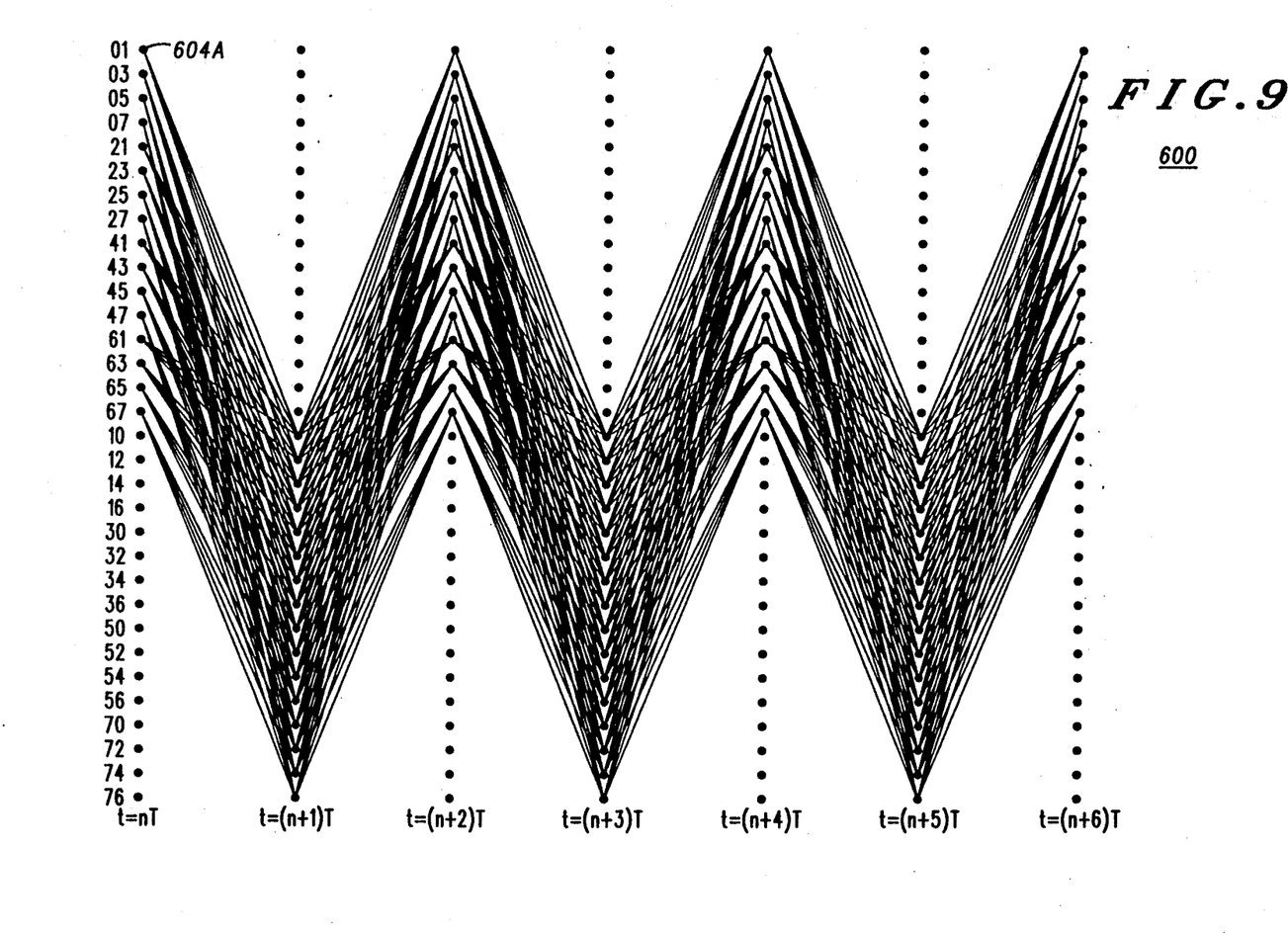
FIG. 9 is a pictorial representation of a trellis of a Viterbi equalizer of another preferred embodiment of the present invention.

FIG. 9 is a pictorial representation of another trellis, here designated by reference numeral 600, constructed according to the teachings of a preferred embodiment of the present invention, and is represented generally by reference numeral 600. Trellis 600 of FIG. 9 is similar to that of trellis 500 of FIG. 8, in that the Viterbi equalizer represented thereby is constructed in a manner such that allowable states at alternating symbol times are representative of the first subset of symbol values, and the allowable states at intervening symbol times are representative of the second subset of symbols.

Trellis 600 differs with that of trellis 500 of FIG. 8, however, in that trellis 600 pictorially shows a two-symbol memory representation of the equalizer. That is, each column of allowable states forming vertically-extending columns represents the values of two symbols, adjacently transmitted. A Viterbi equalizer constructed in such a manner is referred to as having a "two-symbol" memory. (The equations which such a "two symbol memory" equalizer calculates are also similar to those described previously).

Point 604A formed in a first column at a left-hand side of trellis 600 is representative of two symbols transmitted in sequence of which the most recent has a value of "1" and a less recent value of "0". (The value in "1" represents a $\pi/4$ phase, and the value "0" represents a zero radian phase). The other allowable states of trellis 600 are similarly represented by sets of symbols. Four lines extend between points 604A and points of a second column of trellis 600. Each vertically-extending column of trellis 600 is of sixteen possible values. That is, sixteen states are defined at the time interval represented by the first column. Lines correspond to the paths extending between. While not numbered, such lines are analogous to lines 504A-0–504A-3 of FIG. 8B.

It is noted that a trellis representative of an equalizer having a "three-symbol" (or greater) memory may also be represented. The allowable states of such a trellis would be represented by sets of symbols containing three (or greater numbers) of elements.

Figure 10:
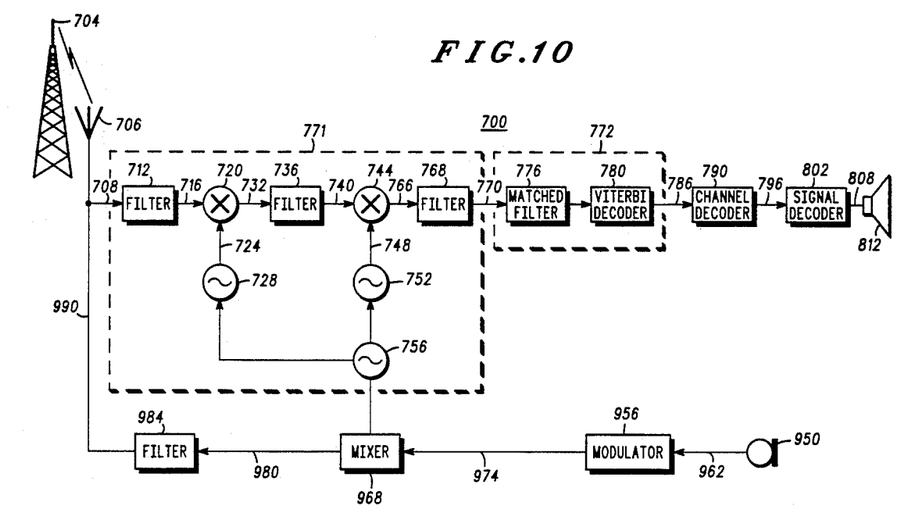
FIG. 10 is a block diagram of a radio telephone of which the Viterbi equalizer of the preferred embodiment of the present invention forms a portion.

Turning finally to the block diagram of FIG. 10, a transceiver, referred to generally by reference numeral 700, constructed according to the teachings of the present invention, is shown. A signal transmitted by a transmitter, here indicated by antenna 704, is transmitted upon a transmission channel, and received by antenna 706 of the transceiver. A signal indicative of the signal received by antenna 704 is generated on line 708 and supplied to filter 712. Filter 712 generates a filtered signal on line 716 which is supplied to first down-mixer circuit 720. Mixer circuit 720 additionally receives an oscillating signal on line 724 which is generated by oscillator 728.

Mixer circuitry 720 generates a down-mixed signal on line 732 which is supplied to filter 736. Filter 736 generates a filtered signal on line 740 which is supplied to second down-mixer 744. Second down-mixer 744 also receives an oscillating signal on line 748 generated by oscillator 752. The oscillating frequencies of oscillators 728 and 752 are preferably, and as illustrated, controlled by the oscillating frequency of oscillator 756 by way of their respective connections thereto on lines 760 and 764.

Second down-mixer 744 generates a signal on line 766 which is supplied to filter 768. Filter 768 generates a filtered signal on line 770. Elements designated by reference numerals 712–768 together form demodulator 771, shown in the Figure by a block, shown in hatch, encompassing elements 712–768.

The signal generated on line 770 is supplied to equalizer 772. As illustrated, equalizer 772 is comprised of matched filter 776 and Viterbi algorithm 780. Equalizer 772 is similar in structure to equalizer 700 of FIG. 10 which forms a maximum likelihood sequence estimator. Equalizer 772 generates an equalized signal on line 786 which is supplied to channel decoder 790. Decoder 790 generates a decoded signal on line 796 which is supplied to signal decoder 802. Signal decoder 802 generates a decoded on line 808 which is supplied to a transducer, here speaker 812.

The block diagram of transceiver 700 further illustrates transmit-portion of transceiver. The transmit-portion of transceiver is shown to comprise generally transducer 950, such as a microphone, which is coupled to modulator 956 by way of line 962, mixer 968 which is coupled to receive the modulated signal generated by modulator 956 on line 974. Circuitry of mixer 968 also receives oscillating signals generated by reference oscillator 756, here indicated by connection of mixer 968 and oscillator 756 by way of line 976. Mixer 968 generates a mixed signal on line 980 which is supplied to filter 984. Filter 984 and filter 712 may, for example, comprise a conventional duplexer. Filter 984 generates a filtered signal on line 990 which is coupled to antenna 706 to transmit a signal therefrom. Because the Viterbi algorithm of equalizer 772 is less complex than equalizers of conventional construction, processing time required to generate an equalized signal on line 786 is reduced.

While the present invention has been described in connection with the preferred embodiments shown in the various figures, it is to be understood that other similar embodiments may be used and modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. A Viterbi equalizer for a receiver operative to receive a signal comprised of a sequence of symbols of a $\pi/4$, differential, phase-shift-keying, modulated signal transmitted to the receiver upon a transmission channel by a transmitter, wherein each symbol of the sequence of symbols comprising the signal is of a symbol value corresponding to a symbol value of a symbol of a set of allowable symbols of a $\pi/4$ constellation set, said Viterbi equalizer for determining a maximum likelihood path representative of a sequence of symbols generated by the transmitter prior to transmission thereof upon the transmission channel, said Viterbi equalizer comprising: means for defining allowable states at certain time intervals, said allowable states defined by subsets of the set of allowable symbol values wherein the subsets defining the allowable states at adjacent ones of the certain time intervals are comprised of at least one nonoverlapping element and wherein a first of any two of the adjacent ones of the certain time intervals comprise a first subset of allowable states and wherein a second of the any two adjacent ones of the certain time intervals comprise a second subset of allowable states; means forming paths for connecting the allowable states defined at adjacent ones of the certain time intervals; and means for selecting individual ones of the paths connecting the states at the adjacent time intervals as survivor paths to form a maximum likelihood path representative of the sequence of symbols generated by the transmitter prior to the transmission thereof upon the transmission channel.

2. The Viterbi equalizer of claim 1 wherein said first subset of allowable states defined by said means for defining comprise four phases of the $\pi/4$ constellation set.

3. The Viterbi equalizer of claim 1 wherein said second subset of allowable states defined by said means for defining comprise four phases of the $\pi/4$ constellation set.

4. The equalizer circuit of claim 3 wherein the Viterbi equalizer comprises an algorithm embodied in processor circuitry.

5. An equalizer circuit for a receiver operative to receive a signal comprised of a sequence of symbols of a $\pi/4$, differential, phase-shift-keying, modulated signal transmitted to the receiver upon a transmission channel by a transmitter wherein each symbol of the sequence of symbols comprising the signal is of a symbol value corresponding to a symbol value of a symbol of a set of allowable symbols of a $\pi/4$ constellation set, said equalizer circuit comprising:

a filter, coupled to receive a signal representative of the signal received by the receiver, for generating a filtered signal also representative of the signal received by the receiver; and a Viterbi equalizer, coupled to receive the filtered signal generated by the filter, said Viterbi equalizer for determining a maximum likelihood path representative of a sequence of symbols generated by the transmitter prior to transmission thereof upon the transmission channel said Viterbi equalizer having means for defining allowable states at certain time intervals, said allowable states defined by subsets of the set of allowable symbol values wherein the subsets defining the allowable states at adjacent ones of the certain time intervals are comprised of at least one nonoverlapping element and wherein a first of any two of the adjacent ones of the certain time intervals comprise a first subset of allowable states and wherein a second of the any two adjacent ones of the certain time intervals comprise a second subset of allowable states; means forming paths for connecting the allowable states defined at adjacent ones of the certain time intervals; and means for selecting individual ones of the paths connecting the states at the adjacent time intervals as survivor paths to form a maximum likelihood path representative of the sequence of symbols generated by the transmitter prior to the transmission thereof upon the transmission channel.

6. The equalizer circuit of claim 5 wherein the filter comprises an algorithm embodied in processor circuitry.

7. An equalizer circuit for a receiver operative to receive a $\pi/4$, quadrature, phase-shift-keying, modulated signal transmitted to the receiver upon a transmission channel by a transmitter, said modulated signal comprised of a sequence of symbols, wherein each symbol of the sequence of symbols comprising the modulated signal is of a symbol value corresponding to a phase value of a symbol of a $\pi/4$ constellation set, said equalizer circuit comprising:
  a filter, coupled to receive a signal representative of the signal received by the receiver, for generating a filtered signal also representative of the signal received by the receiver; and
  a Viterbi equalizer, coupled to receive the filtered signal generated by the filter, said Viterbi equalizer for determining a maximum likelihood path representative of the sequence of symbols generated by the transmitter prior to transmission thereof upon the transmission channel said Viterbi equalizer having means for defining allowable states at certain time intervals, said allowable states defined by subsets of the set of allowable symbol values wherein the subsets defining the allowable states at adjacent ones of the certain time intervals are comprised of at least one nonoverlapping element and wherein a first of any two of the adjacent ones of the certain time intervals comprise a first subset of allowable states and wherein a second of the any two adjacent ones of the certain time intervals comprise a second subset of allowable states, means forming paths for connecting the allowable states defined at adjacent ones of the certain time intervals, and means for selecting individual ones of the paths connecting the states at the adjacent time intervals as survivor paths to form a maximum likelihood path representative of the sequence of symbols generated by the transmitter prior to the transmission thereof upon the transmission channel.

8. In a radio transceiver having transmitter circuitry operative to transmit a signal and receiver circuitry operative to receive a signal, said signal received by the receiver circuitry comprised of a sequence of symbols, wherein each symbol of the sequence of symbols comprising a $\pi/4$, differential, phase-shift-keying, modulated signal is of a symbol value corresponding to a symbol value of a symbol of a set of allowable symbols of a $\pi/4$ constellation set, a combination with the receiver circuitry of an equalizer circuit, said equalizer circuit having:
  a filter, coupled to receive a signal representative of the signal received by the receiver circuitry, for generating a filtered signal also representative of the signal received by the receiver; and
  a Viterbi equalizer, coupled to receive the filtered signal generated by the filter, said Viterbi equalizer for determining a maximum likelihood path representative of the sequence of symbols generated by the transmitter prior to transmission thereof upon the transmission channel said Viterbi equalizer having means for defining allowable states at certain time intervals, said allowable states defined by subsets of the set of allowable symbol values wherein the subsets defining the allowable states at adjacent ones of the certain time intervals are comprised of at least one nonoverlapping element and wherein a first of any two of the adjacent ones of the certain time intervals comprise a first subset of allowable states and wherein a second of the any two adjacent ones of the certain time intervals comprise a second subset of allowable states, means forming paths for connecting the allowable states defined at adjacent ones of the certain time intervals, and means for selecting individual ones of the paths connecting the states at the adjacent time intervals as survivor paths to form a maximum likelihood path representative of the sequence of symbols generated by the transmitter prior to the transmission thereof upon the transmission channel.

9. In a radio receiver having receiver circuitry operative to receive a signal transmitted thereto upon a transmission channel by a transmitter, said signal comprised of a sequence of symbols of a $\pi/4$, differential, phase-shift-keying, modulated signal, wherein each symbol of the sequence of symbols comprising the signal is of a symbol value corresponding to a symbol value of a symbol of a set of allowable symbols of a $\pi/4$ constellation set, a combination with the receiver circuitry of an equalizer circuit, said equalizer circuit having:
  a filter, coupled to receive a signal representative of the signal received by the receiver circuitry for generating a filtered signal also representative of the signal transmitted to the receiver; and
  a Viterbi equalizer, coupled to receive the filtered signal generated by the filter, said Viterbi equalizer for determining a maximum likelihood path representative of the sequence of symbols generated by the transmitter prior to transmission thereof upon the transmission channel said Viterbi equalizer having means for defining allowable states at certain time intervals, said allowable states defined by subsets of the set of allowable symbol values wherein the subsets defining the allowable states at adjacent ones of the certain time intervals are comprised of at least one nonoverlapping element and wherein a first of any two of the adjacent one of the certain time intervals comprise a first subset of allowable states and wherein a second of the any two adjacent ones of the certain time intervals comprise a second subset of allowable states, means forming paths for connecting the allowable states defined at adjacent ones of the certain time intervals, and means for selecting individual ones of the paths connecting the states at the adjacent time intervals as survivor paths to form a maximum likelihood path representative of the sequence of symbols generated by the transmitter prior to the transmission thereof upon the transmission channel.

* * * * *